Dec. 20, 1932.   M. R. SIMON   1,891,654
ACCIDENT DISPLAY BOARD
Filed March 16, 1931
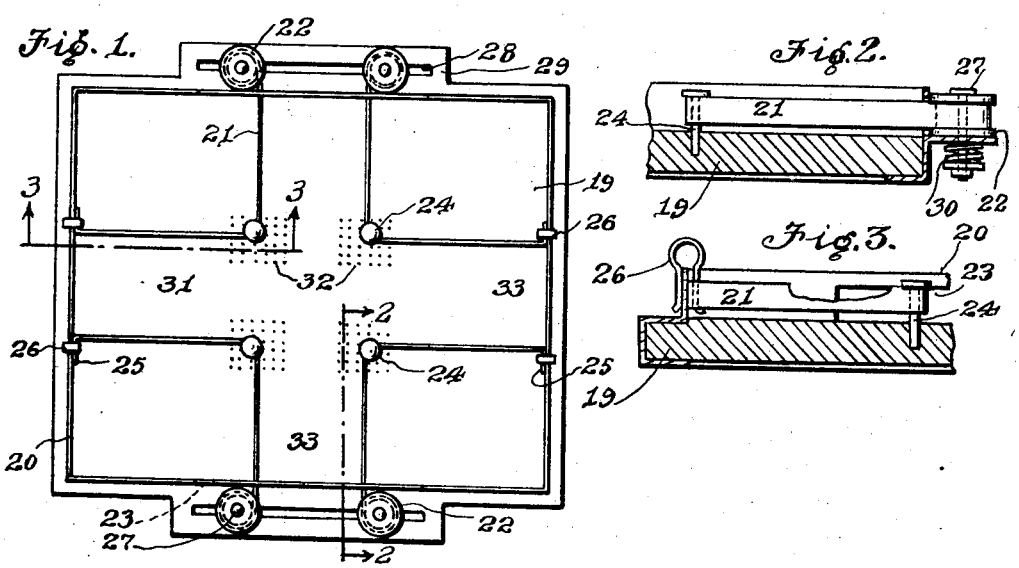
INVENTOR.
Mortimer R. Simon
BY
J. Kaplan
ATTORNEY.

Patented Dec. 20, 1932

1,891,654

UNITED STATES PATENT OFFICE

MORTIMER R. SIMON, OF PASSAIC, NEW JERSEY

ACCIDENT DISPLAY BOARD

Application filed March 16, 1931. Serial No. 523,034.

This invention relates to a device for displaying or investigating street accidents.

The growing use of automobiles and the consequent congestion of our thoroughfares are not originally built for such traffic are constantly giving rise to collisions and other street accidents which require investigation.

It has been customary in the case of automobile accidents or other street occurrences to investigate the facts by interrogating available witnesses and by writing down and analyzing their statements. It has been experienced that according to that method it is only with great difficulty that the real truth of the situation can be ascertained, if at all. The witness's subsequent impressions of the location of the vehicles or other objects involved, even that of his own person is likely to be much at fault. He attempts to describe the event from a mental picture which does not come out clearly for various reasons, including faultiness in the original observation, fading from lapse of time, and weakness in the faculty of visualization, present in many instances to a marked degree. It has been found that even the mind highly trained in many other respects is likely to show a very limited ability to describe in words the essential details of such events and it is well known that no two persons can describe a street accident alike.

Such varying and conflicting verbal reports have furnished the data from which the truth of the matter has been sought to be ascertained, and in the many cases wherein a jury has finally been asked to solve the problem the evidence has been mostly such that the answer given is the sheerest guess.

The present invention has been evolved as a result of long experience in dealing with the problem, and has for its prime object the provision of means for conducting an investigation of street occurrences whereby the truth, with a fair, reasonable, and in many instances a full degree of accuracy may be ascertained.

It is a specific object to provide means whereby the witness may be shown, or may himself illustrate, the substantially exact situation as to the relative position of objects involved, proceeding on the theory that, given suitable means, it is within the capacity of the witnesses to build up a visible expression of the scene which is substantially true and exact, taking appropriate physical objects piece by piece and locating them, rearranging them if necessary, and finally creating an optical expression patterned after that stamped upon his mind by the object at and involved in the occurrence.

The drawing illustrates one form of the invention. It is obvious that the actual needs of manufacture may necessitate certain mechanical changes. It is therefore not intended to limit the invention to the embodiment illustrated but rather to define such limits in the appended claims.

In the drawing:

Figure 1 is a top view of a preferred form of the device shown on a reduced scale.

Figure 2 is an enlarged sectional view taken on the line 2—2 of Figure 1, and

Figure 3 is an enlarged sectional view taken on line 3—3 of Figure 1.

Numeral 19 designates the board, 20 the upstanding flange and 21 the set of tapes leading from the spools 22. The tapes pass through the slots 23 of the flange, pass around the pins 24 and are fastened at the ends 25 to the flange 20 by the spring clips 26. The spools contain a supply of tape and are journaled on bolts 27 slidable in the slots 28 of the rim 29. At the bottom of the bolts are compression springs 30 for frictionally pressing the spool against the rim and thus prevent the spool from accidently revolving and unwinding the tape. The floor 31 of the board is provided with a series of holes 32 in which can fit the lower end of the pins. Thus if it is desired to change the width of the streets 33 the pins can be inserted in a corresponding hole and the spools 22 and the clips 26 lined up with the new position of the pins.

It will thus be seen that I have provided a simple and efficient device for indicating vehicle accidents. The device can be arranged to an accurate scale with the street or highway and can readily and easily be used, understood, and operated by all persons of ordinary intelligence.

Having described my invention, I claim:

1. In a device of the class described in combination, a board member having an upstanding flange, a set of tapes for defining the streets, pins attached to said board member, said pins being movable, said tapes bent around said pins, one end of each said tape movably fastened to said flange and the other end leading from a spool movably attached to said board member.

2. In a device of the class described, the combination with a board member, of a set of spools movably attached to said board member, a tape wound around each of said spools, and pins adapted to be inserted in the board and the tapes adapted to be drawn off from the spools and passed around the pins to define streets.

3. In a device of the class described, a board member having an upstanding flange, a set of spools movably attached to said board member, a set of tapes for defining streets, pins attached to said board member, said pins being movable, said tapes bent around said pins, one of the ends of said tapes movably fastened to said flange and the other ends of said tapes leading from spools movably attached to said board member.

4. In a device of the class described in combination, a board member, a set of tapes for defining street curbs, pins attached to said board member, said pins being movable, said tapes passed around said pins, means for holding the free end of each of said tapes in a given position, the other end of each of said tapes being fastened to a spool movably attached to said board member.

5. In a device of the class described, the combination of a board member, a set of spools movably attached to said board member, tapes passed around said spools and adapted to define street curbs, pins associated with the said board member, said tapes passed around said pins.

6. In a device of the class described, the combination of a board member, a set of spools movably attached to said board member, tapes wound around said spools and adapted to define street curbs, means for holding the loose end of each of said tapes against board member, and movable pins associated with said board member, said tapes partly passed around said pins.

7. In a device of the class described, a board member having an upstanding flange, a set of spools movably attached to said board member, a set of tapes for defining streets, pins attached to said board member, said pins being movable, said tapes bent around said pins, one end of said tapes movably fastened to said flange and the other end of said tapes leading from said spools attached to said board member.

8. In a device of the class described, a board member having an upstanding flange, a set of spools movably attached to said board member, a set of tapes for defining streets, pins attached to said board member, said pins being movable, said tapes bent around said pins, one end of said tapes movably fastened to said flange and the other end of said tapes leading from said spools attached to said board member, and springs for keeping said spools against said board member.

9. In a device of the class described, a board member, a set of spools movably connected to said board member, each of said spools holding a supply of tape, pins movably attached to said board member, said tapes passed around said pins whereby to define street curbs.

10. In a device of the class described, a board member, a set of spools movably connected to said board member, each of said spools holding a supply of tape adapted to be unwound therefrom, pins movably attached to said board member, the part of the tape unwound from each spool being passed around a pin whereby to define a street curb, and means to hold the loose end of said tape against said board member.

11. In a device of the class described, a board member having one or more movable pins associated therewith, a magazine of tape associated with said board member and adapted to retain one end of the tape, said tape adapted to be drawn from said magazine and passed around one or more of said pins, and means to hold the free end of said tape in a given place.

In testimony whereof I affix my signature.

MORTIMER R. SIMON.